United States Patent Office 3,553,777
Patented Jan. 12, 1971

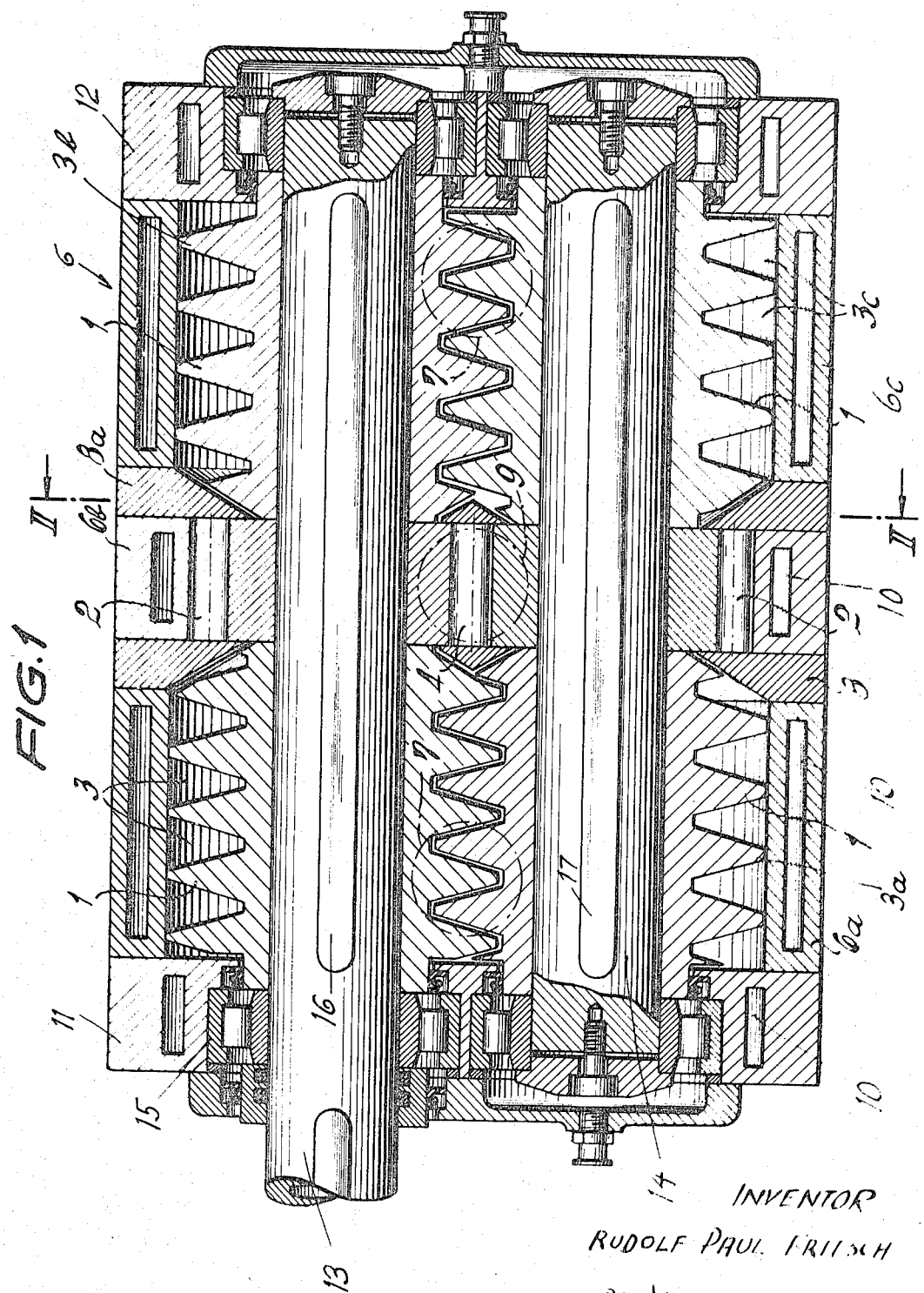

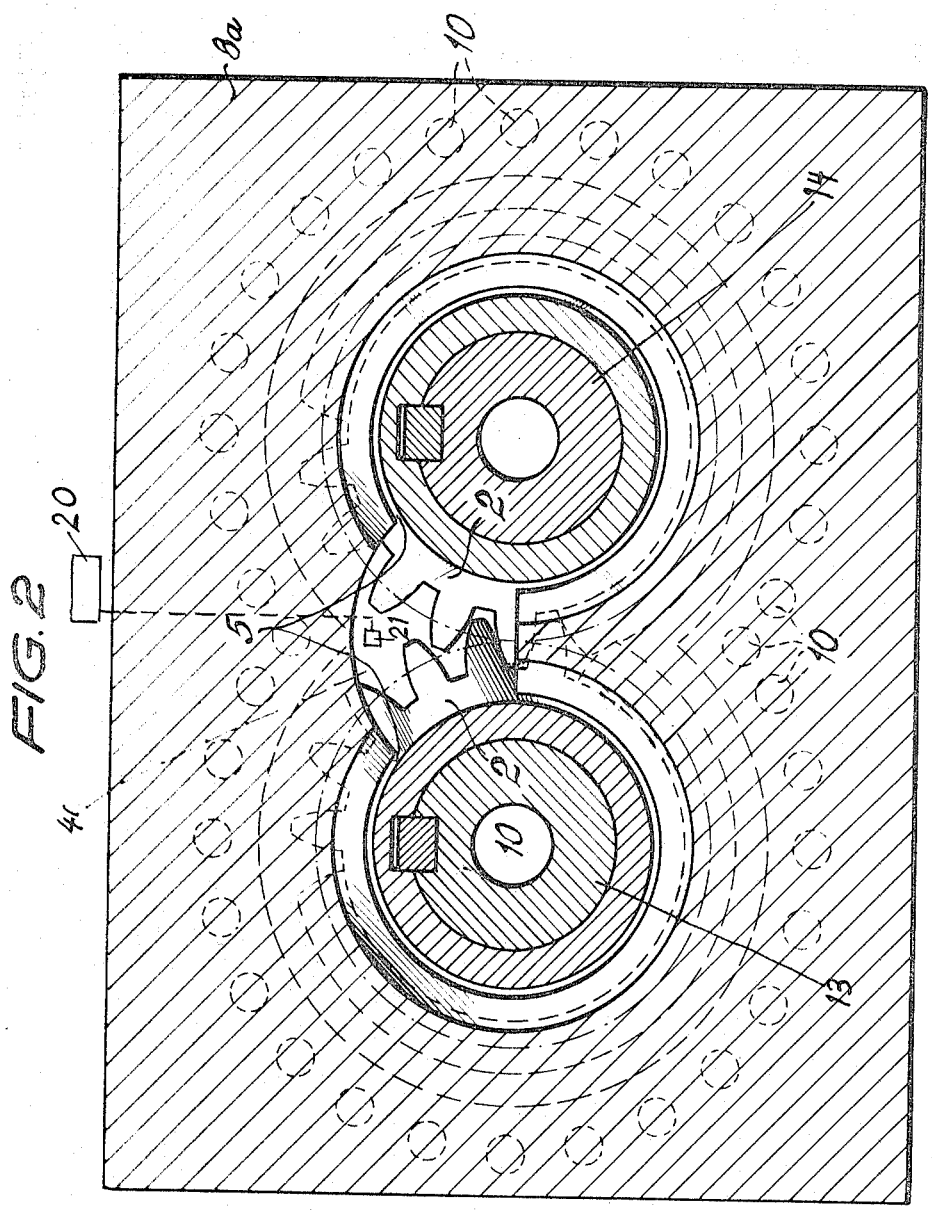

3,553,777
DEVICE FOR EXTRUDING PLASTIC MATERIAL
Rudolf Paul Fritsch, Stuttgart-Weilimdorf, Germany, assignor to Werner & Pfleiderer, Stuttgart-Feuerbach, Germany, a company of Germany
Filed Oct. 22, 1968, Ser. No. 769,551
Claims priority, application Germany, Oct. 24, 1967, W 45,037
Int. Cl. B29f 3/02
U.S. Cl. 18—12                     5 Claims

ABSTRACT OF THE DISCLOSURE

A device for extruding plastic material comprises an intermediate zone including a gear pump and two outer feeding zones disposed on opposite sides of the intermediate zone and each including conveyor screws conveying the material toward the intermediate zone. The outer zones are separated from the intermediate zone by partition walls and communication between the outer zones and the intermediate zone is effected only through a recess in each partition wall. The recesses lead into a space of the intermediate zone defined therein by teeth of the gears of the pump when approaching the meshing position. An extrusion port communicates with a further space in the intermediate zone defined therein by teeth of the pump gears when departing from the meshing zone.

SPECIFICATION

The invention relates to a device for extruding at low friction and substantially independent of viscosity, plastic material against a high counter pressure and more particularly to a device for extruding thermoplastic synthetic material.

BACKGROUND

There are known devices for continuously feeding plastic material and in particular thermoplastic synthetic material to an extrusion die or nozzle. Devices of this kind are either single-screw or multiple-screw extruders the conveying pressure of which serves to overcome the counter pressure built up at the extrusion die or nozzle, the magnitude of such counter pressure being dependent to a large extent on the viscosity of the material to be processed. If a filter is interposed between the conveying screw or screws and the extension die or nozzle, the counter pressure is obviously increased. The use of such filters is often necessary to filter out foreign discrete particles which may be trapped in the material. Depending upon the mesh of the filter, the counter perssure to be overcome may be in the order of several 100 kg./cm.² As a result, the output of the extruders per unit of time tends to decrease sharply since obviously, as previously explained, the quantity of the material conveyed by an extruder depends upon the counter pressure to be overcome and the viscosity of the material.

An additional problem is caused by the fact that the driving power supplied to the extruder or extruders for driving the same is converted into heat to a very large extent. As a result, the operational temperature may be elevated to an extent such that the material to be processed deteriorates or even completely decomposes and thus becomes useless. Moreover, if thermoplastic materials are processed, elevation of heat usually results in a decrease of the viscosity of the material which, in turn, may cause substantial leakage flows interfering with a smooth conveyance of the material to be extruded.

In addition to the afore pointed out disadvantages of conventional devices as hereinbefore referred to, such devices have the disadvantage that certain materials cannot be purified at all by filtering as the counter pressures then would reach a magnitude beyond the normal conveying power of conventional devices. Moreover, the extruder of known devices must be very long and are hence costly as the screw or screws of the extruder require multiple gang threads to overcome high counter pressures when the material to be processed has a low viscosity as is particularly the case when the device is charged with a melt. The resulting axial thrust must be transmitted through the entire length of the extruder and absorbed by an axial-thrust bearing. Bearings of this kind are very expensive and require frequent servicing, especially if the extruder is a multiple screw extruder. Multiple screw extruders are presently widely used when the material to be processed has a low viscosity as such extruders have better conveying capabilities than single screw extruders.

It is also known to use gear pumps especially when the material has a low viscosity. Such pumps are capable of overcoming high counter pressures even if the material has a low viscosity. However, gear pumps also have significant disadvantages particularly if thermoplastic synthetic materials are to be processed as such materials have the tendency to decompose more or less rapidly when exposed for a prolonged period of time to a substantially elevated temperature as may be caused by the afore explained conversion of driving energy into heat. In actual practice, it is virtually impossible to eliminate completely small leakages at the bearing and bushings used in the device and as a result, small quantities of the material may creep into the bearings or bushings. Such escaped material is or may be subjected to prolonged dwell times at elevated temperature and as a result, will become decomposed. Attempts have been made to use bleeder screws for the purpose of continuously flushing with fresh material the points of the device at which accumulations of escaped material are likely to occur. The material used for such flushing must, of course, be continuously discharged from the device as otherwise it cannot serve the purpose and such continuous discharge of usable material represents a rather substantial loss of valuable material.

THE INVENTION

It is a broad object of the invention to provide a novel and improved device for extruding plastic material especially thermoplastic synthetic material which has the advantges of the aforediscussed conventional devices without the disadvantages thereof.

A more specific object of the invention is to provide a novel and improved device of the general kind above referred to in which the material to be processed can be extruded at low friction and substantially independent of the viscosity of the material against high counter pressures without causing generation of high axial thrust.

Another more specific object of the invention is to provide a novel and improved device of the general kind above referred to which is continuously self-feeding, substantially independent of the viscosity of the material.

The aforepointed-out objects, features and advantages and other objects, features and advantages which will be pointed out hereinafter and set forth in the appended claims constituting part of the application are obtained by providing in a generally cylindrical closed housing intermediate the ends thereof a gear pump having two meshing gears. Screw conveyors are disposed in the housing on each side of the gear pump for conveying the material to be processed from the ends of the housing toward said gear pump. Partition walls between the respective ends of the screw conveyors and the gears define two outer zones and one intermediate zone within the housing, each of the said two outer zones having a feed port and the intermediate zone having a discharge port preferably radially disposed in the respective wall portion of the housing. The teeth of the gears when approaching the meshing position and when departing from said position define within the intermediate zone an approximately cloverleaf or hourglass shaped space. Each of the partition walls has a recess adjacent to the part of said space as is defined by the approaching teeth of the gears, said recesses constituting the only flow passages between said space part and the outer zones. The discharge port communicates with the part of the space in the intermediate zone which is defined by the departing teeth of the gears.

The shafts for the gears of the pump and the screws of the extruder and the walls of the housing preferably include suitably disposed and dimensioned ducts for passing a heating or cooling medium therethrough to maintain the device at a selected temperature.

The invention also provides that a pressure measuring device probes the part of the hourglass shaped space which is defined by the approaching teeth of the gear pump. The indications of this device may be utilized to regulate, either manually or automatically by conventional means, the quantity of the material fed to the device by varying the rotational speed of the power drive means for the device.

The invention also contemplates to include in the extruder screws kneading elements such as kneading discs of conventional design.

In the accompanying drawing a preferred embodiment of the invention is shown by way of illustration and not by way of limitation.

In the drawings:

FIG. 1 is a sectional view of an extruder device according to the invention; and FIG. 2 is a section taken on line II—II of FIG. 1.

Referring now to the figures more in detail, the exemplified extruding device comprises a housing 6 composed of three cylindrical sections 6a, 6b and 6c closed off at both ends and held together by end plates 11 and 12. The end plates are secured in position by suitable fastening means clearly illustrated but not described in detail as they do not constitute part of the invention. The mid portion 6b of the housing accommodates a gear pump comprising two meshing gears 2 seated on shafts 13 and 14 extending through the housing and journalled in end plates 11 and 12 by suitable bearings 15. Shaft 13 protrudes from the housing for coupling thereto a second extruding device if desired and a drive motor (not shown), either directly or via a reduction gear. The shafts have seated thereon meshing screws 3, 3a and 3b, 3c respectively. The screws are axially slidable on the shaft but secured against rotation by keys 16 and 17 which also secure gears 2 against rotation. The threads of the screws are pitched to convey from the outer ends of housing 6 toward the middle thereof.

As is evident the entire device can be conveniently disassembled by detaching for instance, the right hand end plate 12.

Partition walls 8 and 8a on opposite sides of the gear pump divide the housing into three zones, to wit, two outer zones on opposite sides of the gear pump and a mid zone including the gear pump.

As can best be seen in FIG. 2 the teeth of the gears when and while approaching the meshing position and when and while departing from the meshing position define within the mid zone an approximately hourglass or cloverleaf shaped space 4. The part of this space as defined by the teeth of the gears when approaching the meshing position when rotating in the direction indicated by arrows in FIG. 2 communicates with the two outer zones through narrow slotlike recesses 5 formed in plates 8 and 8a respectively as is also indicated in FIG. 2. These recesses constitute the only passages between the intermediate zone and the outer zones. The part of space 4 as defined by the teeth of the gears when departing from the meshing zone is connected to a preferably radially disposed discharge port 9. The material to be processed is fed into the outer zones via feed ports 7.

The housing sections 6a, 6b, 6c, the end walls 11 and 12, and the shafts 13 and 14 preferably include ducts 10 for passage of a cooling or heating medium to control the operational temperature of the device.

A conventional pressure responsive measuring instrument diagrammatically indicated at 20 measures the pressure within working space 4 and more specifically in the part thereof defined by teeth approaching the meshing position by means of a diagrammatically indicated probe 21. The indications of the measuring instrument may be utilized to control, manually or automatically, the rotational speed at which shaft 13 is driven and thus the amount of material fed by the conveyor screws to the gear pump.

What is claimed is:

1. A device for extruding, at low friction and substantially independent of viscosity, plastic material against a high counter pressure, said device comprising in combination:

a generally cylindrical housing closed at both ends by end walls;

a gear pump including two meshing gears mounted in the housing intermediate the ends thereof and rotatable about axes parallel to the lengthwise axis of the housing;

screw conveyors disposed in the housing on opposite sides of said gear pump, the screws of said conveyors being coaxial with the gears of said pump and conveying from the ends of the housing toward said gear pump;

partition walls interposed between the respective ends of the screw conveyors and the gears of the pump to define two outer zones and one intermediate zone within the housing, each of said outer zones having a feed port and the intermediate zone having a discharge port for the material;

the teeth of the gears of the pump when approaching the meshing position and when departing from said position defining within said intermediate zone an approximately hourglass shaped space;

each of said partition walls having a recess adjacent to the space part defined by the approaching teeth, said recesses providing the only passages between said space part and said outer zones, and said discharge port communicating with the space part defined by the departing teeth.

2. The device according to claim 1 wherein one screw conveyor in each outer zone and one of the gears of the gear pump are seated on a common shaft and another screw conveyor in each outer zone and the second gear of the pump are seated on a second common shaft.

3. The device according to claim 2 wherein the walls of said housing and said shafts include ducts for directing a heating or a cooling medium therethrough.

4. The device according to claim 1 wherein the cylindrical wall of said housing is divided into three cylindrical wall sections, the two outer wall sections being juxtaposed to the screw conveyors in said outer zones and the intermediate wall section being juxtaposed to said gear pump, said feed ports being in the walls of the outer sections and the discharge port in the wall of the intermediate section.

5. The device according to claim 1 and further comprising pressure sensitive measuring means disposed in the space part defined by the approaching teeth of the gears of said gear pump to measure the pressure of material in said space part.

References Cited

UNITED STATES PATENTS

| | | | |
|---|---|---|---|
| 2,175,054 | 10/1939 | Ferngren et al. | 18—12SPUX |
| 2,970,341 | 2/1961 | Mallory et al. | 18—12SFUX |
| 3,407,438 | 10/1968 | Selbach | 18—12SPUX |

ANDREW R. JUHASZ, Primary Examiner

L. GILDEN, Assistant Examiner

U.S. Cl. X.R.

18—30; 103—128; 259—6